United States Patent
Fiedziuk

(10) Patent No.: US 10,309,551 B2
(45) Date of Patent: Jun. 4, 2019

(54) CHECK VALVES

(71) Applicant: Hamilton Sundstrand Corporation, Charlotte, NC (US)

(72) Inventor: Mariusz Fiedziuk, Olesnica (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 344 days.

(21) Appl. No.: 15/378,260

(22) Filed: Dec. 14, 2016

(65) Prior Publication Data

US 2017/0167632 A1 Jun. 15, 2017

(30) Foreign Application Priority Data

Dec. 14, 2015 (EP) ..................................... 15461583

(51) Int. Cl.
*F16K 15/03* (2006.01)
*F16K 27/02* (2006.01)
*F16K 47/00* (2006.01)

(52) U.S. Cl.
CPC ............ *F16K 47/00* (2013.01); *F16K 15/038* (2013.01); *F16K 27/0209* (2013.01)

(58) Field of Classification Search
CPC ......... Y10T 137/7839; Y10T 137/7898; Y10T 137/7901; Y10T 137/7902; F16K 47/00; F16K 15/038; F16K 27/0209
See application file for complete search history.

(56) References Cited

U.S. PATENT DOCUMENTS

| 1,487,038 | A | * | 3/1924 | Spencer | .................. F16K 47/00 |
| | | | | | 137/512.1 |
| 1,708,907 | A | * | 4/1929 | Spencer | ................ F16K 15/038 |
| | | | | | 137/512.1 |
| 2,877,792 | A | * | 3/1959 | Tybus | ................... F16K 15/038 |
| | | | | | 137/512.1 |
| 2,898,080 | A | * | 8/1959 | Smith | ..................... F16K 1/223 |
| | | | | | 137/512.15 |

(Continued)

FOREIGN PATENT DOCUMENTS

| EP | 1895212 A1 | 3/2008 |
| EP | 2249068 A2 | 11/2010 |

(Continued)

OTHER PUBLICATIONS

European Search Report for Application No. 15461583.5-1751; dated May 27, 2016; 6 pages.

*Primary Examiner* — Marina A Tietjen
*Assistant Examiner* — Frederick D Soski
(74) *Attorney, Agent, or Firm* — Cantor Colburn LLP

(57) ABSTRACT

A check valve comprises a valve housing defining a valve opening and a pair of flapper elements pivotably mounted relative to the housing for rotation between an open position in which they permit fluid flow through the opening and a closed position in which they prevent fluid flow through the opening. Each flapper element comprises a first surface facing the opening and a second surface opposite the first surface and facing away from the opening. The valve further comprises a bowed leaf spring member mounted to the second surface of each flapper element. The leaf spring members are arranged such that when the flapper elements move towards the closed position, the bowed leaf spring members move into engagement with one another.

15 Claims, 10 Drawing Sheets

(56) References Cited

U.S. PATENT DOCUMENTS

| | | | | |
|---|---|---|---|---|
| 3,023,771 A * | 3/1962 | Hinds | F16K 15/038 | 137/454.2 |
| 3,047,012 A * | 7/1962 | Smith | F16K 47/00 | 137/512.15 |
| 3,072,141 A * | 1/1963 | Wheeler, Jr. | F16K 1/223 | 137/512.1 |
| 3,166,093 A * | 1/1965 | Hopper | F16K 15/038 | 137/512.15 |
| 3,208,472 A * | 9/1965 | Scaramucci | F16K 15/038 | 137/454.2 |
| 3,374,804 A * | 3/1968 | Stegerud | F16K 15/038 | 137/242 |
| 3,452,778 A * | 7/1969 | Babcock | F16K 15/038 | 137/512.1 |
| 3,538,946 A * | 11/1970 | Hilsheimer | F16K 15/038 | 137/512.1 |
| 4,043,358 A * | 8/1977 | Sliski | F16K 15/038 | 137/512.1 |
| 4,094,336 A * | 6/1978 | Urschel | F16K 15/038 | 137/512.1 |
| 4,249,567 A * | 2/1981 | Weiss | F16K 15/038 | 137/512 |
| 4,457,333 A * | 7/1984 | Sharp | F16K 15/038 | 137/454.2 |
| 4,854,341 A | 8/1989 | Bauer | | |
| 4,867,199 A * | 9/1989 | Marx | F16K 15/038 | 137/512.1 |
| 4,896,695 A * | 1/1990 | Pysh | F16K 15/038 | 137/512.1 |
| 5,392,810 A | 2/1995 | Cooper et al. | | |
| 6,237,625 B1 * | 5/2001 | Randolph | F16K 15/038 | 137/512.15 |
| 6,443,183 B1 | 9/2002 | Roorda | | |
| 7,249,611 B2 | 7/2007 | Scaramucci et al. | | |
| 8,381,401 B2 | 2/2013 | Sahs et al. | | |
| 9,581,256 B2 * | 2/2017 | Barone | F16K 15/038 | |
| 10,167,974 B2 * | 1/2019 | Minta | F16K 27/0209 | |
| 2004/0065370 A1 * | 4/2004 | Gallego Buzon | F16K 15/038 | 137/512.1 |
| 2007/0235088 A1 * | 10/2007 | Klein | F16K 15/031 | 137/512.15 |
| 2008/0023080 A1 * | 1/2008 | McGonigle | F16K 15/038 | 137/512.15 |
| 2008/0053536 A1 * | 3/2008 | Denike | B64D 13/02 | 137/512.1 |
| 2008/0072973 A1 * | 3/2008 | McGonigle | B64D 13/02 | 137/512.1 |
| 2008/0072974 A1 * | 3/2008 | Denike | F16K 15/038 | 137/527 |
| 2008/0078458 A1 * | 4/2008 | Denike | B64D 13/02 | 137/512.1 |
| 2008/0078459 A1 * | 4/2008 | Warriner | B64D 13/02 | 137/512.1 |
| 2009/0056818 A1 * | 3/2009 | McGonigle | F16K 15/038 | 137/527 |
| 2014/0041739 A1 * | 2/2014 | Barone | F16K 15/038 | 137/516.25 |
| 2015/0068612 A1 * | 3/2015 | Barone | F16K 15/038 | 137/15.18 |
| 2015/0240960 A1 * | 8/2015 | Kamp | F16K 15/038 | 137/856 |
| 2015/0240962 A1 * | 8/2015 | Plummer | F16K 17/40 | 137/300 |
| 2015/0267824 A1 * | 9/2015 | Feng | F16K 47/00 | 137/12 |
| 2015/0330524 A1 * | 11/2015 | Talawar | F16K 15/03 | 137/527.8 |
| 2016/0018012 A1 * | 1/2016 | Kamp | E05D 5/128 | 16/386 |
| 2016/0040792 A1 * | 2/2016 | Kamp | F16K 15/03 | 137/15.19 |
| 2016/0040799 A1 * | 2/2016 | Kamp | F16K 15/038 | 137/15.19 |
| 2016/0084393 A1 * | 3/2016 | Barone | F16K 15/038 | 137/527 |
| 2016/0208939 A1 * | 7/2016 | Patel | F16K 15/00 | |
| 2017/0167620 A1 * | 6/2017 | Minta | F16K 27/0209 | |
| 2017/0167632 A1 * | 6/2017 | Fiedziuk | F16K 15/038 | |
| 2017/0292621 A1 * | 10/2017 | Olszowy | F16K 15/03 | |
| 2017/0356555 A1 * | 12/2017 | Solarz | F16K 15/038 | |
| 2017/0356561 A1 * | 12/2017 | Reszewicz | F16K 15/038 | |
| 2018/0355985 A1 * | 12/2018 | Reszewicz | F16K 15/038 | |

FOREIGN PATENT DOCUMENTS

| | | |
|---|---|---|
| GB | 1413636 A | 11/1975 |
| JP | 3121513 B2 | 1/2001 |

\* cited by examiner

CHECK VALVES

FOREIGN PRIORITY

This application claims priority to European Patent Application No. 15461583.5, filed 14 Dec. 2015, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, to provide a stop for the rotational movement of the flapper elements as they open, the flappers may be provided with stop elements which, when the flappers move to their open position, engage one another. In other constructions, a stop bar is mounted to extend between the flapper elements and spaced from the opening such that when the flappers open, they engage the stop bar.

The present disclosure relates to a check valve includes a modified stop mechanism.

SUMMARY

From one aspect, there is disclosed herein a check valve which comprises a valve housing defining a valve opening and a pair of flapper elements pivotably mounted relative to the housing for rotation between an open position in which they permit fluid flow through the opening and a closed position in which they prevent fluid flow through the opening. The flapper elements each comprise a first surface facing the opening and a second surface opposite the first surface and facing away from the opening. A bowed leaf spring member is mounted to the second surface of each flapper element. The leaf spring members are arranged such that when the flapper elements move towards the closed position, the bowed leaf spring members move into engagement with a respective stop element.

In one embodiment, the leaf spring members are arranged so as to move into engagement with each other. In this arrangement, the leaf spring member of one flapper element effectively acts as a stop for the other flapper element.

In one embodiment, the leaf spring member comprises a first end and a second end, and both ends of the leaf spring member are translationally fixedly attached to the respective flapper element.

In an alternative embodiment, the leaf spring member comprises a first end and a second end, and one end of the leaf spring member is translationally fixedly attached to the respective flapper element and the other end of the leaf spring member is mounted so as to allow that end of the leaf spring member to translate relative to the second surface of the respective flapper element.

In a yet further embodiment, the leaf spring member comprises a first end and a second end, and both ends of the leaf spring member are mounted so as to allow both ends of the leaf spring member to translate relative to the second surface of the respective flapper element.

The translationally fixed attachment between the leaf spring member and flapper element may comprise a hinge pin mounted to the second surface of the respective flapper element, the respective end of the leaf spring member being pivotally mounted to hinge pin.

The translational attachment between the leaf spring member and flapper element may comprise a pin mounted to the second surface of the respective flapper element, with the respective end of the leaf spring member being positioned between the pin and the second surface.

The translationally movable end(s) of the leaf spring member may be convexly curved in the direction of the second surface of the respective flapper element.

The respective leaf spring member may be mounted to extend perpendicularly to the pivot axis of the flapper elements. In other arrangements, the leaf spring member may be parallel to the pivot axis.

A single leaf spring member may be provided on each flapper element, for example generally centrally thereon.

The leaf spring members may extend generally along a diameter of the valve.

A backstop may be provided in certain embodiments, to prevent over-rotation of the flapper elements. In one embodiment, the backstop may be provided on at least one post of a pair of posts of the valve housing arranged at opposed sides of the valve opening and supporting a hinge pin for the flapper elements.

Some embodiments of the disclosure will now be described by way of example only with reference to the accompanying drawings in which:

DETAILED DESCRIPTION

Figure 1:
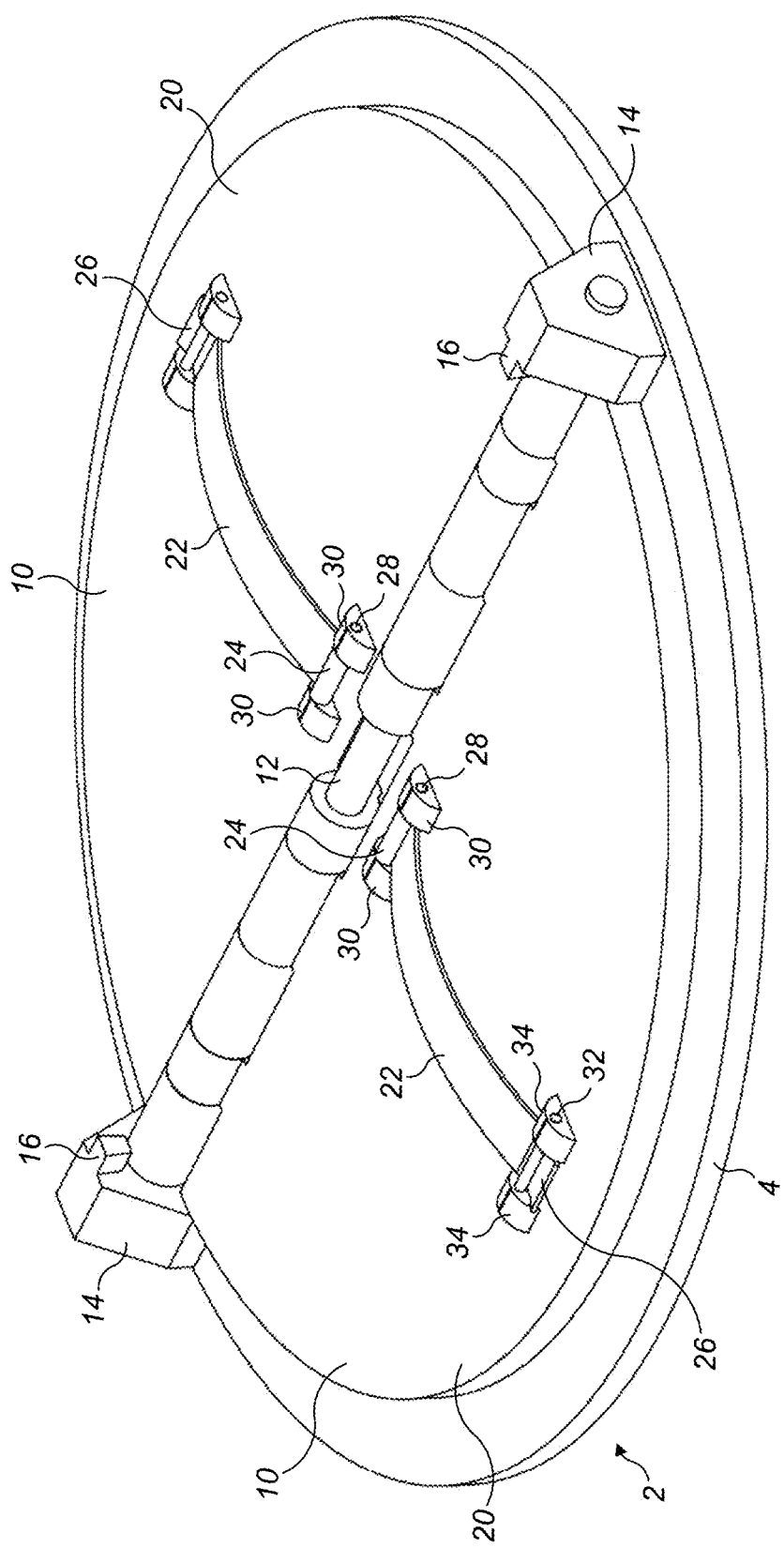
FIG. 1 shows a perspective view of a first embodiment of check valve in accordance with this disclosure, in a closed configuration.
Figure 2:
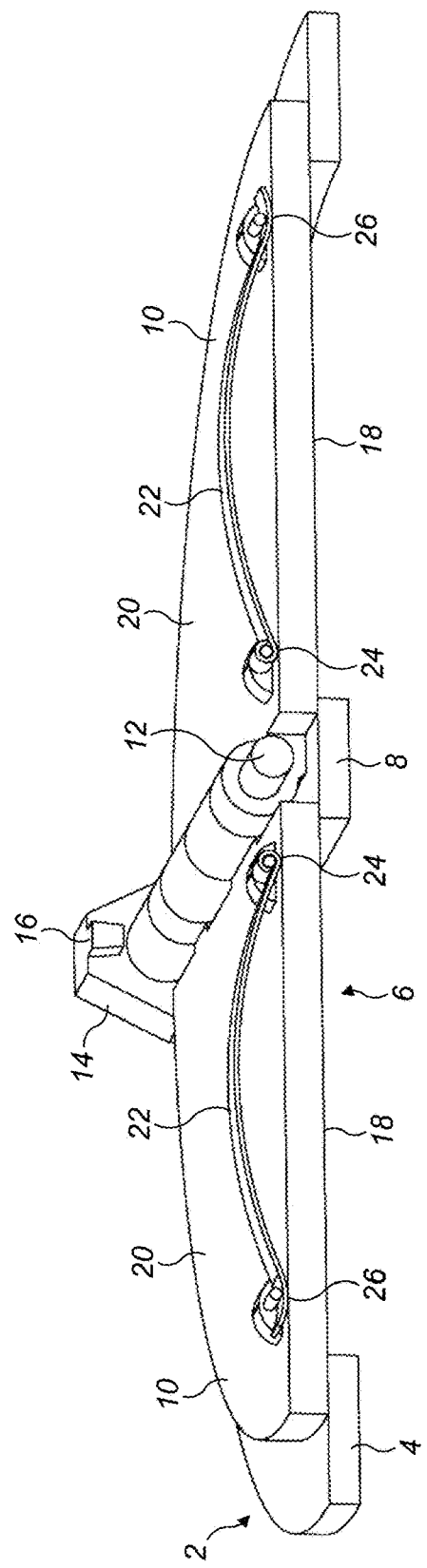
FIG. 2 shows a vertical section through the check valve of FIG. 1.
Figure 3:
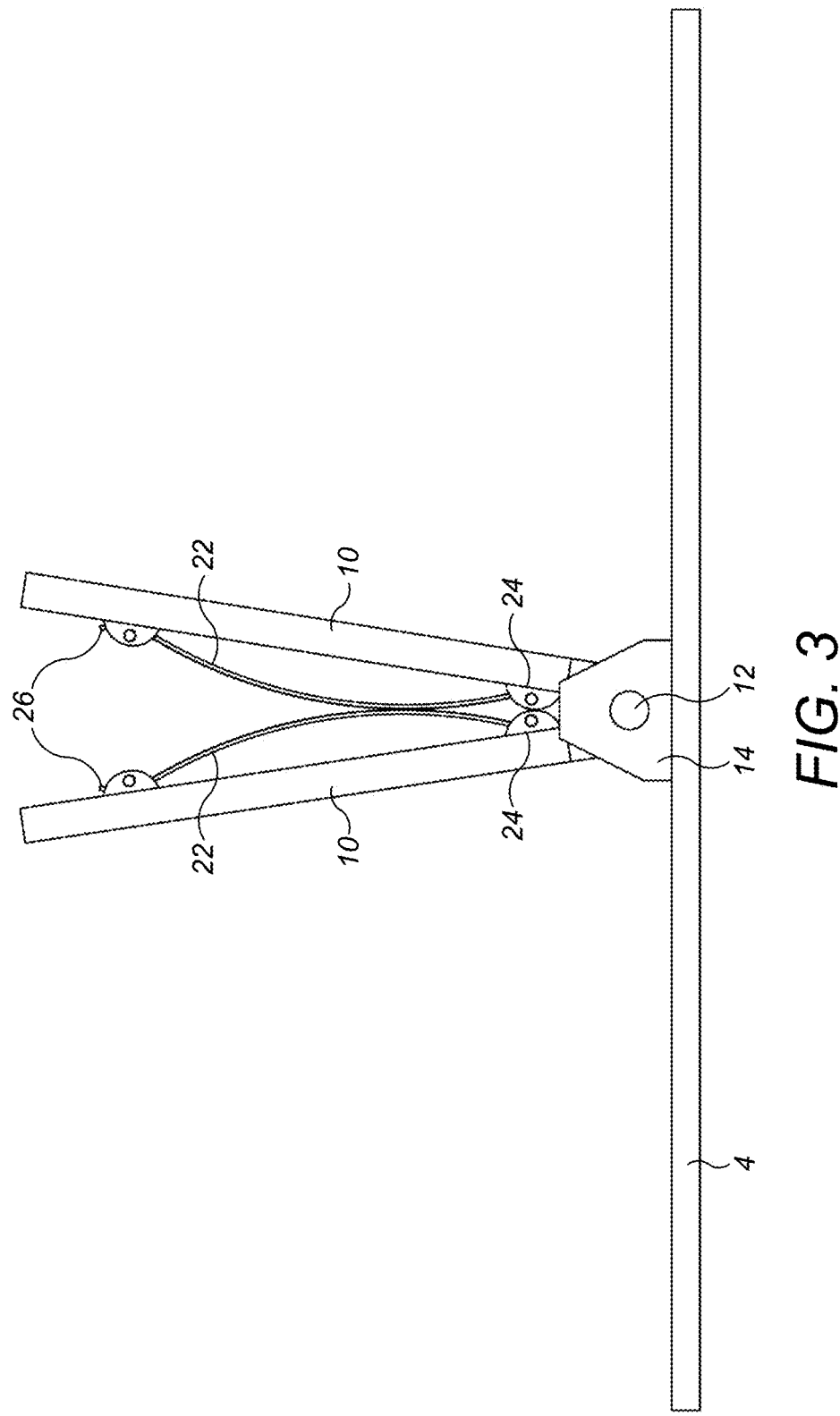
FIG. 3 shows a side view of the check valve of FIG. 1 in an open configuration.

With reference to FIGS. 1 to 3, a first embodiment of check valve 2 in accordance with this disclosure is illustrated.

The check valve 2 comprises a valve housing 4. The valve housing 4 defines an opening 6 therethrough in the form of two generally D-shaped apertures (see FIG. 4) separated by a central web 8 of the valve housing 4. The opening is closed by a pair of generally D-shaped flapper elements 10.

The flapper elements 10 are mounted to a hinge pin 12 which are in turn mounted to mounting posts 14 which extend upwardly from the valve housing 4 on opposed sides of the valve opening 6.

Respective, tapering backstops 16 project inwardly from the respective mounting posts 14, as will be described further below.

Each flapper element 10 has a first surface 18 which faces the opening 6 and a second surface 20 opposite the first surface 18 and facing away from the opening 6.

A bowed leaf spring member 22 is mounted to the second surface 20 of each flapper element 10. The leaf spring member 22 can be made of any suitable material, for example a metal, for example stainless steel, nickel steel and so on, depending on the intended operating environment of the check vale 2.

The leaf spring members 22 extend generally perpendicularly to the pivotal axis of the flapper elements 10 defined by the hinge pin 12 and are arranged centrally on each flapper element 10 such that they lie on a diameter of the check valve 2. The leaf spring members 22 are aligned such that when the flapper elements 10 are in a closed position, the leaf spring elements 22 engage (as shown in FIG. 3).

Each leaf spring 22 has a first end 24 which is hingedly attached to the respective flapper element 10 and a second end 26.

The first end 26 of the leaf spring 20 is translationally fixed relative to the associated flapper element 10 and extends pivotally around a first spring mounting pin 28 which is mounted between a first pair of lugs 30 projecting from the second surface 20 of the flapper element 10. In other arrangements the pin 28 may be formed integrally with the lugs 30, and the pin 28 need not be circular in cross section. The term pin should therefore be construed broadly in this context.

The second end 28 of the leaf spring 20 is convexly curved towards the second surface 20 of the flapper element 10 to provide a smooth engagement with that second surface 20. The curved section extends loosely under a second spring mounting pin 32 which is mounted between a second pair of lugs 34 projecting from the second surface 20 of the flapper element 10. Again, in other embodiments, the pin 32 may be formed integrally with the lugs 34, and the pin 32 need not be circular in cross section. This mounting will allow the curved second end 28 of the leaf spring element 22 to slide or translate along the second surface 20 of the flapper element 10.

In this embodiment, the first, translationally fixed end 26 of the leaf spring member 22 is arranged towards the pivotal axis of the flapper 10, and the translationally free, second end 26 arranged remote from the pivotal axis. In other embodiments, however, they may be arranged the other way around.

It will be apparent from the above that the leaf spring elements 22 are retained on the flapper elements 10 such that when they are pressed inwardly (i.e. towards the second surface 20) between their first and second ends 24, 26, they will be able to deform such that the second end 26 of the leaf spring element 22 will be able to translate or slide along the second surface 20 of the flapper element 10 as the leaf spring element 22 flattens out.

When the flapper elements 10 are exposed to a flow of fluid through the opening 6 which opens the valve 2, the leaf spring elements 22 will come into contact, as shown in FIG. 3. In effect, each respective leaf spring elements act 22 as respective stops for the other flapper element 10.

As the leaf spring elements 22 come into contact, they will deform and tend to flatten out as described above. This acts to reduce the impact of the flapper elements 10 with one another or with a stop element and absorbs at least some of the impact energy. Moreover, the translationally free mounting of the second end 26 of the leaf spring member 22 advantageously allows the energy to be dissipated by friction with the flapper element 10.

It will be appreciated that over-rotation of either flapper element 10 will be prevented by engagement of the flapper element 10 with the backstop 16. However, whilst this backstop 16 may stop the movement of the flapper elements 10, it will not have to absorb significant impact energy as that will have been done by the engagement of the leaf spring members 22.

Figure 5:
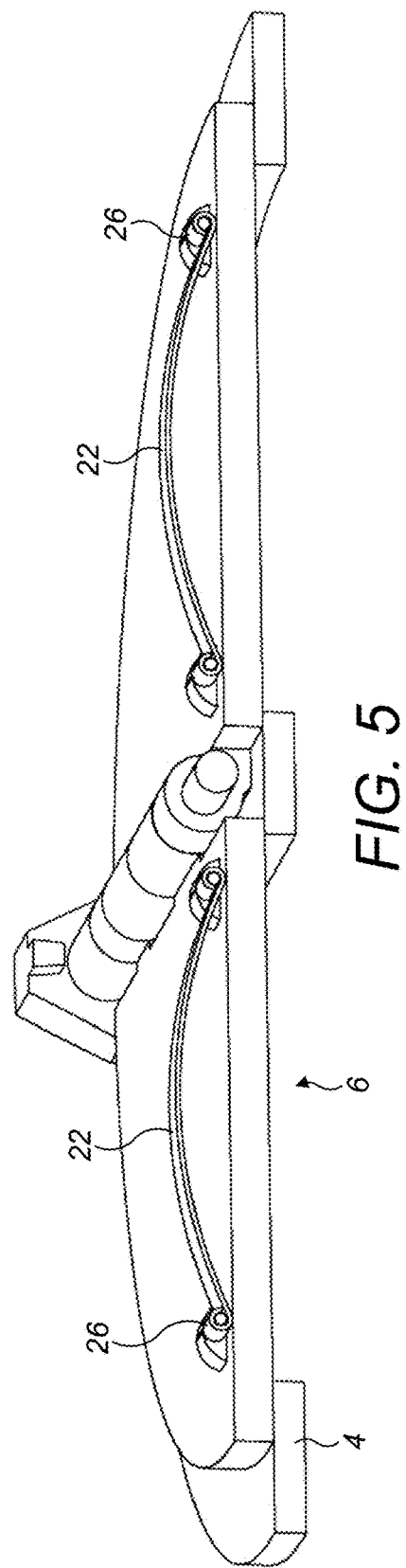
FIG. 5 shows a vertical section through the check valve of FIG. 4.
Figure 6:
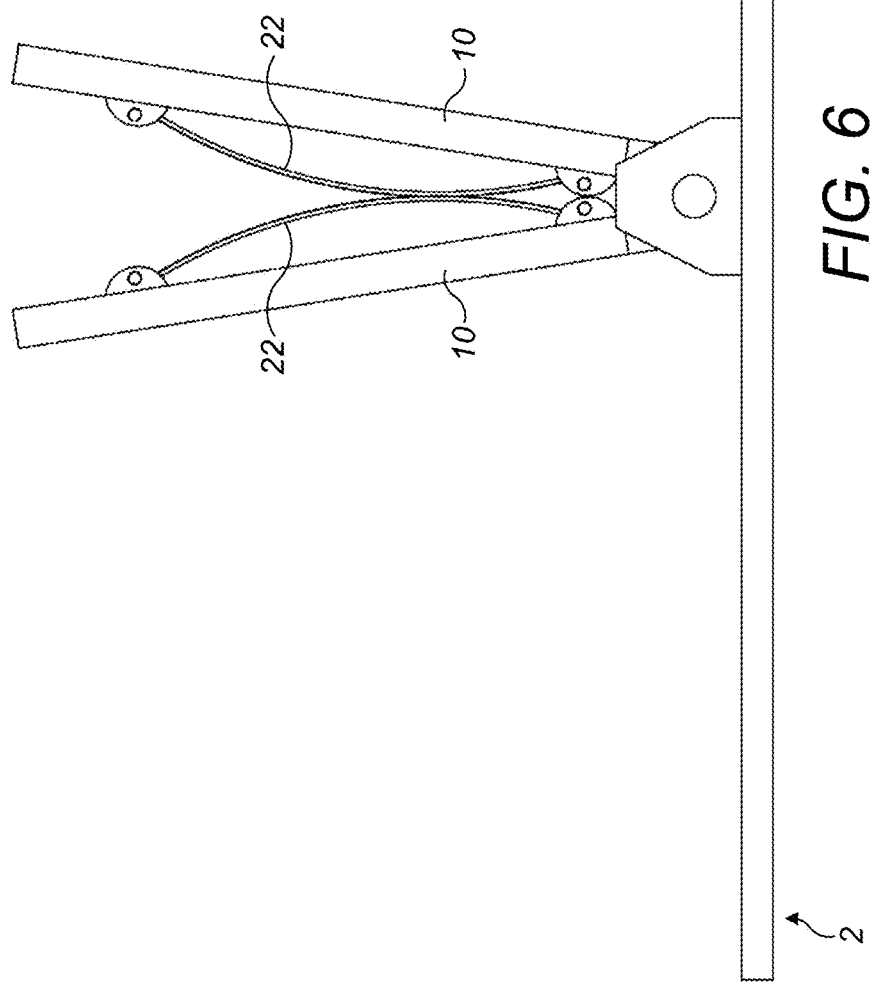
FIG. 6 shows a side view of the check valve of FIG. 4 in an open configuration.

A second embodiment of check valve 2' will now be described with reference to FIGS. 4 to 6. The general construction of the check valve 2' is similar to that of the first embodiment, and only the differences over the first embodiment will be described.

In this embodiment, instead of the second end 26 of the leaf spring member 22 being loosely and slidably retained by the second leaf spring member mounting pin 32, the second end 26 extends pivotally around the second leaf spring member mounting pin 32, in the same manner as the first end 24 does around the first leaf spring mounting pin 28. In this arrangement, therefore, both ends 24, 26 of the leaf spring element 22 are translationally fixed, with impact energy being absorbed by the resilient engagement of the leaf spring members 22.

Other embodiments of the disclosure can also be envisaged. For example in another embodiment, both ends 24, 26 of the leaf spring element 22 may be loosely retained as described in respect of the second end 26 of the leaf spring member 22 of the first embodiment described above. Such an arrangement may have the advantage of improved impact energy absorption, but may not provide such a secure attachment of the leaf spring member 22 to the valve 2.

In other embodiments, the leaf spring elements 22 need not engage with one another, but they may engage with a separate stop element. For example a stop element may be provided on the opposing flapper element 10 or on a separate stop element mounted to the valve housing 6, for example a stop pin extending between the mounting posts 14.

Figure 7:
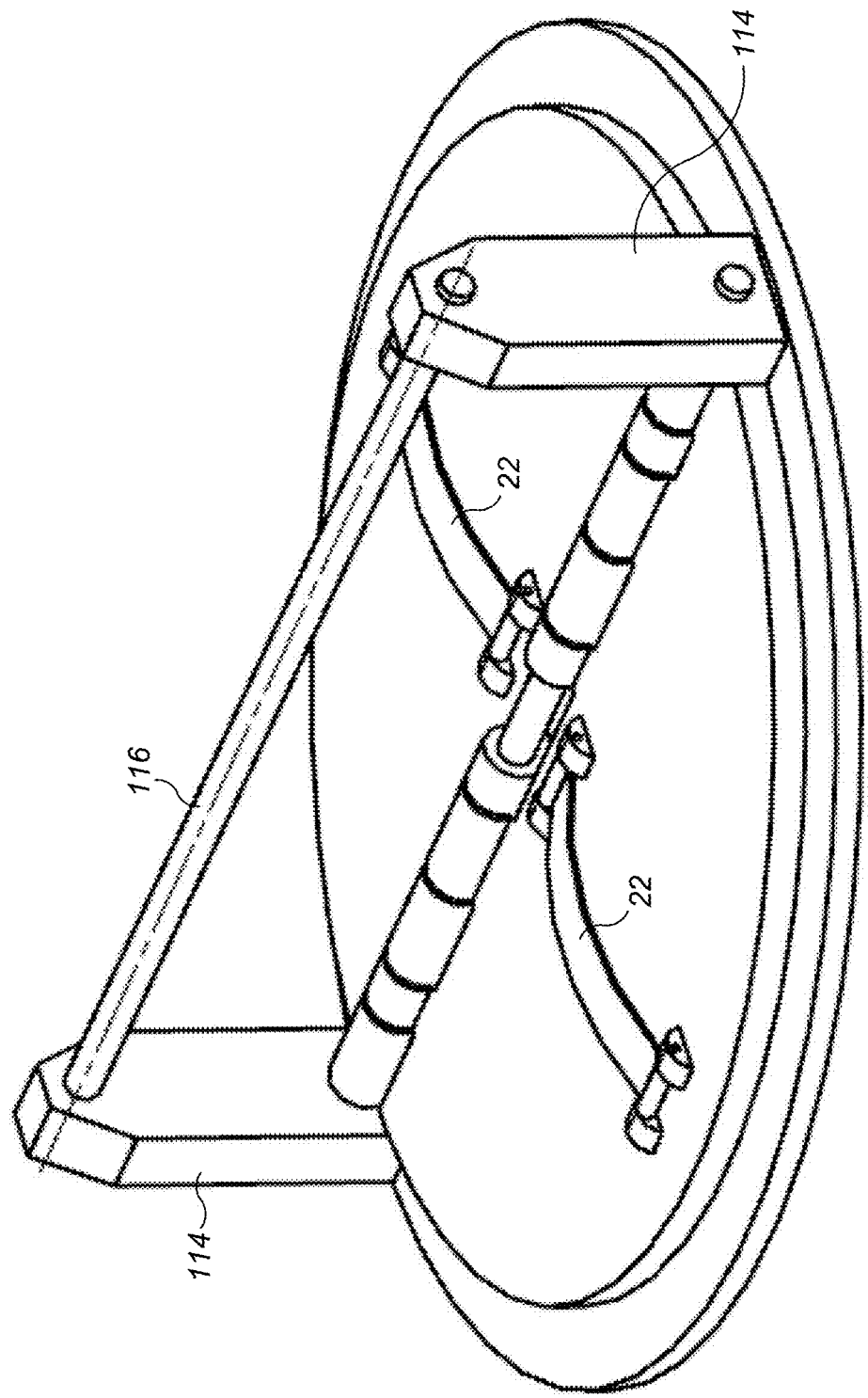
FIG. 7 shows a third embodiment of a check valve in accordance with this disclosure, in a closed configuration.
Figure 8:
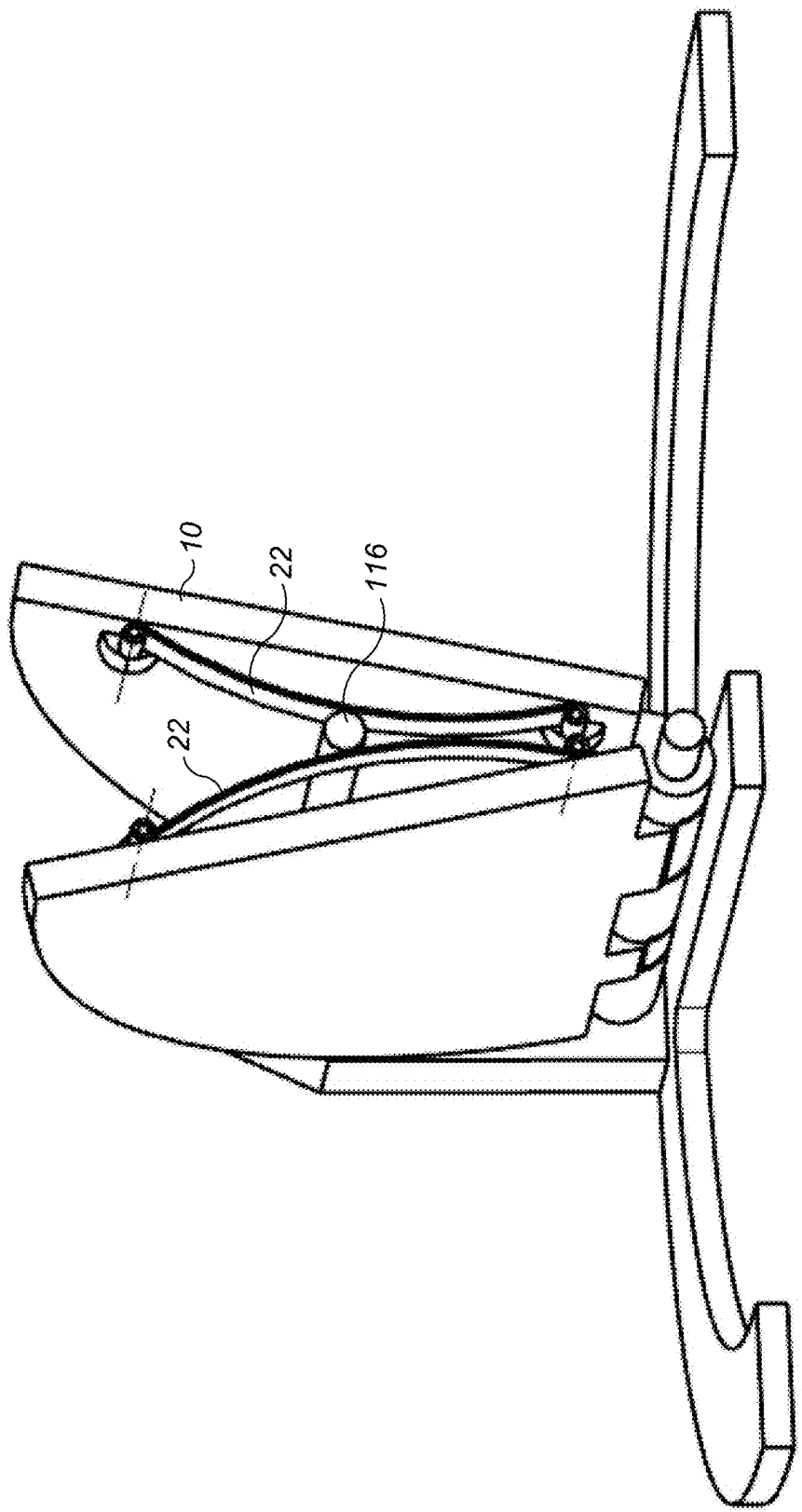
FIG. 8 shows a sectional view of the check valve of FIG. 7 in an open configuration.

An example of such an embodiment is shown in FIGS. 7 and 8. In this embodiment, the mounting posts 114 are elongated with respect to the mounting posts 14 of the earlier embodiments and mount a stop pin 116 extending therebetween. The stop pin 116 acts as a back stop for the flapper elements 10 by virtue of the engagement of the stop pin 116 with the leaf spring elements 22. The stop pin 116 may be positioned such that the respective leaf spring elements 22 only contact the stop pin 116 (and not each other). Alternatively, the leaf spring elements 22 may engage with each other either before or after either contacts the stop pin 116. In such arrangements, advantageously, the leaf spring members 22 should contact the stop pin 116 first.

Figure 4:
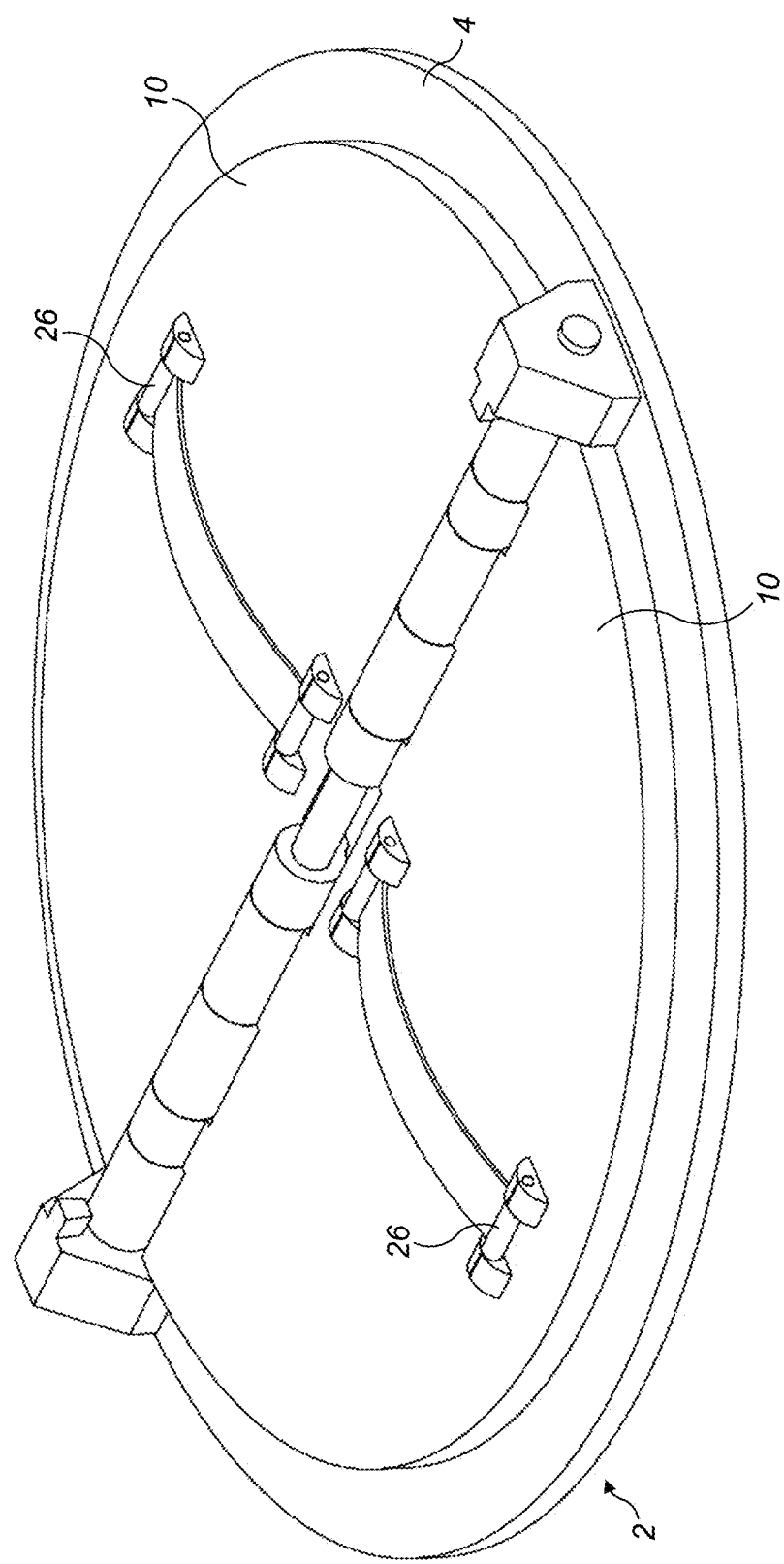
FIG. 4 shows a perspective view of a second embodiment of check valve in accordance with this disclosure, in a closed configuration.

In the embodiment of FIGS. 7 and 8, the leaf spring ends 26, 28 are attached to the flapper elements 10 in the manner shown in FIG. 4, although it will be appreciated that in other embodiments the leaf spring ends 26, 28 may be attached as shown in the alternative manners discussed above.

In the embodiments described above, the same form and orientation of leaf spring member 22 is provided on each flapper element 10. However, this is not essential. Thus in other embodiments the leaf spring members 22 may be arranged parallel to the flapper pivot axis or hinge pin 12 rather than perpendicular to it as illustrated. The leaf spring members 22 could also be arranged at some other angle to the hinge pin 12.

The leaf spring members 22 are illustrated in the embodiment such that they are substantially aligned with one another along their length when engaged, i.e. they lie in the same plane. However, again this is not essential and the leaf spring members 22 may be arranged in non-parallel planes.

Also, while a single leaf spring member 22 is provided on each flapper element 10, in other embodiments multiple leaf spring members 22 may be provided. For example, in some embodiments, respective leaf spring members 22 may be provided at the respective ends of each flapper element 10.

Figure 9:
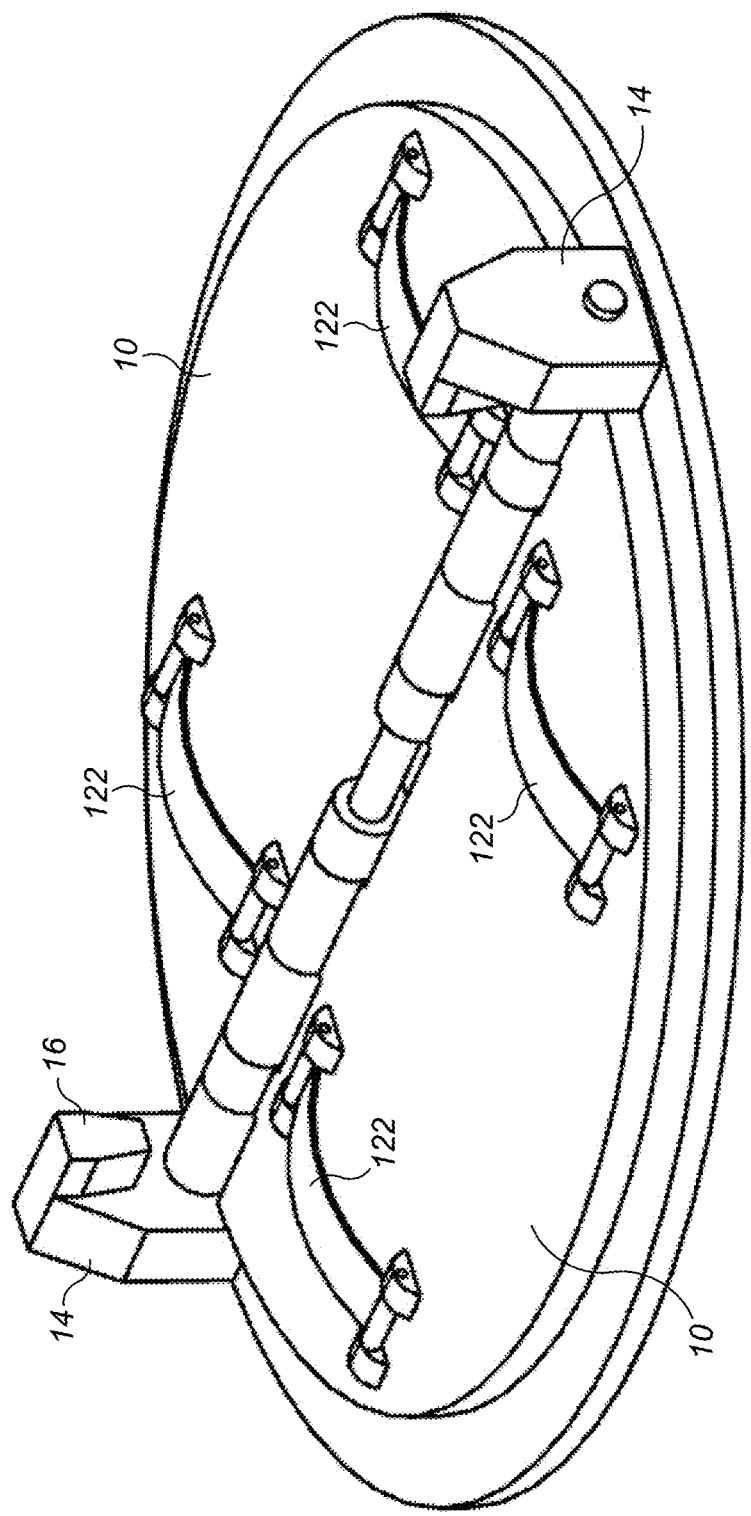
FIG. 9 shows a fourth embodiment of a check valve in accordance with this disclosure, in a closed configuration.

FIG. 9 illustrates such an embodiment. In this embodiment, two leaf spring members 122 are provided on each flapper element 10 adjacent the mounting posts 14. Otherwise the embodiment is similar to the embodiment of FIGS. 4 to 6. Again the leaf spring members 122 may be attached to the flapper elements 10 in any of the manners discussed above.

Figure 10:
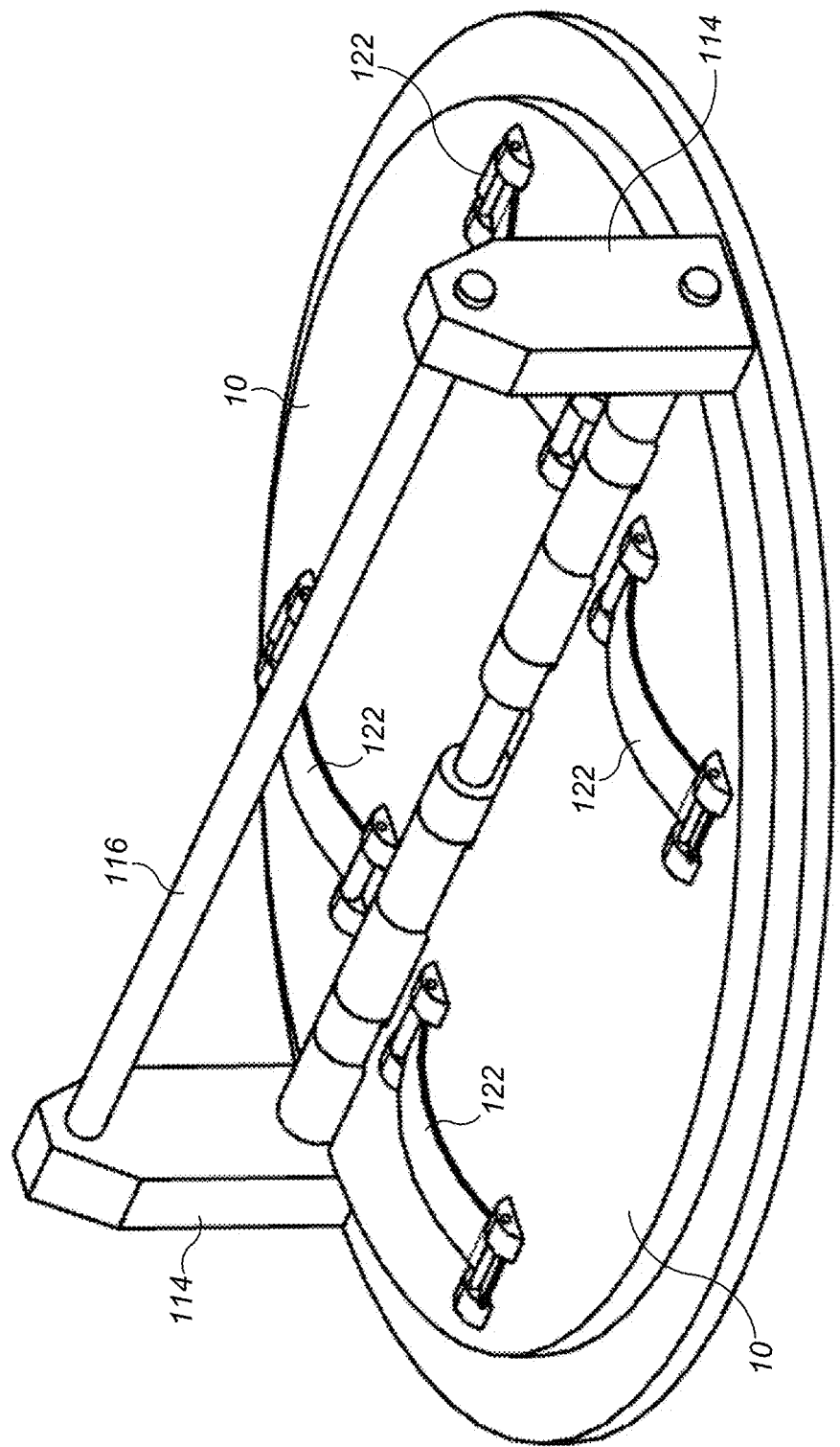
FIG. 10 shows a fifth embodiment of a check valve in accordance with this disclosure, in a closed configuration.

FIG. 10 illustrates a second such embodiment, in which two leaf spring members 122 are provided on each flapper element 10 adjacent mounting posts 114. In this embodiment, however, a stop pin 116 is provided extending between the mounting posts 114, in a similar manner to the embodiment of FIGS. 7 and 8.

It will be understood that the embodiments of the disclosure described above may provide a longer valve life since the impact forces associated with the opening of the flapper elements 10 are more effectively absorbed by the bowed leaf spring members 22 than in the prior art.

The invention claimed is:

1. A check valve comprising:
a valve housing defining a valve opening;
a pair of flapper elements pivotably mounted relative to the housing for rotation between an open position in which they permit fluid flow through the opening and a closed position in which they prevent fluid flow through the opening, each flapper element comprising a first surface facing the opening and a second surface opposite the first surface and facing away from the opening; and
a bowed leaf spring member mounted to the second surface of each flapper elements, the leaf spring members being arranged such that when the flapper elements move towards the closed position, the bowed leaf spring members move into engagement with a respective stop member.

2. A check valve as claimed in claim 1, wherein the bowed leaf spring members are arranged such that they move into engagement with each other.

3. A check valve as claimed in claim 1, wherein the leaf spring member comprises a first end and a second end, and wherein the first end and the second end are translationally fixedly attached to the respective flapper element.

4. A check valve as claimed in claim 1, wherein the leaf spring member comprises a first end and a second end, and wherein the first end of the leaf spring member is translationally fixedly attached to the respective flapper element and the second end of the leaf spring member is mounted so as to allow that end to translate relative to the second surface of the respective flapper element.

5. A check valve as claimed in claim 1, wherein the leaf spring member comprises a first end and a second end, and wherein the first and second ends of the leaf spring member are mounted so as to allow both ends of the leaf spring member to translate relative to the second surface of the respective flapper element.

6. A check valve as claimed in claim 3, wherein the translationally fixed attachment of the respective leaf spring member end to the respective flapper element comprises a hinge pin mounted to the second surface of the respective flapper element, the end of the leaf spring member being pivotally mounted around the hinge pin.

7. A check valve as claimed in claim 4, wherein the translationally free attachment of the leaf spring member end to the respective flapper element comprises a pin mounted to the second surface of the respective flapper element, the respective end of the leaf spring member being positioned between the pin and the second surface.

8. A check valve as claimed in claim 4, wherein the translationally free end of the leaf spring member is convexly curved in the direction of the second surface of the flapper element.

9. A check valve as claimed in claim 1, wherein the respective leaf spring members are mounted to extend perpendicularly to the pivot axis of the flapper elements.

10. A check valve as claimed in claim 1, wherein the respective leaf spring members are mounted to extend parallel to the pivot axis of the flapper elements.

11. A check valve as claimed in claim 1, comprising a single leaf spring member provided on each flapper element.

12. A check valve as claimed in claim 11, wherein the leaf spring members are arranged centrally on the flapper elements.

13. A check valve as claimed in claim 12 wherein the leaf spring members extend along a diameter of the valve.

14. A check valve as claimed in claim 1, further comprising a backstop for preventing over-rotation of the flapper elements.

15. A check valve as claimed in claim 14, wherein a backstop is provided on at least one post of the valve housing arranged at opposed sides of the valve opening and supporting a hinge pin for the flapper elements.

* * * * *